United States Patent
Wang et al.

(10) Patent No.: US 8,335,611 B2
(45) Date of Patent: Dec. 18, 2012

(54) METHODS AND SYSTEMS FOR CONTROLLING MOTOR CURRENT IN STEERING SYSTEMS OF VEHICLES EQUIPPED WITH ELECTRIC STEERING ASSIST

(75) Inventors: Lin Wang, Troy, MI (US); Kenneth L. Oblizajek, Troy, MI (US); R. Larry Arbanas, Farmington Hills, MI (US); John D. Sopoci, Commerce Township, MI (US); Scott R. Kloess, Rochester Hills, MI (US); Jose M. Lopez, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 897 days.

(21) Appl. No.: 12/326,684

(22) Filed: Dec. 2, 2008

(65) Prior Publication Data

US 2010/0138109 A1    Jun. 3, 2010

(51) Int. Cl.
    *B62D 5/09*    (2006.01)

(52) U.S. Cl. ........................................... 701/41; 701/42

(58) Field of Classification Search .................... 701/41, 701/42
    See application file for complete search history.

(56) References Cited

U.S. PATENT DOCUMENTS

| | | | | |
|---|---|---|---|---|
| 6,422,335 B1 * | 7/2002 | Miller | ........................... | 180/446 |
| 6,789,641 B2 * | 9/2004 | McLaughlin | .................. | 180/446 |
| 6,999,862 B2 * | 2/2006 | Tamaizumi et al. | ............ | 701/41 |
| 7,860,624 B2 * | 12/2010 | Kubota et al. | .................... | 701/41 |
| 7,873,453 B2 * | 1/2011 | Kobayashi et al. | ............. | 701/41 |
| 7,918,306 B2 * | 4/2011 | Tamaizumi | ................... | 180/446 |
| 2005/0251311 A1 * | 11/2005 | Burton et al. | .................... | 701/41 |
| 2006/0069481 A1 * | 3/2006 | Kubota et al. | .................... | 701/41 |
| 2008/0033613 A1 * | 2/2008 | Tamaizumi et al. | ............ | 701/41 |
| 2009/0024280 A1 * | 1/2009 | Kato et al. | ....................... | 701/41 |
| 2009/0099731 A1 * | 4/2009 | Watanabe et al. | ............... | 701/41 |
| 2009/0125186 A1 * | 5/2009 | Recker et al. | ................... | 701/41 |
| 2009/0276121 A1 * | 11/2009 | Limpibunterng et al. | ...... | 701/41 |

* cited by examiner

*Primary Examiner* — Lesley D Morris
*Assistant Examiner* — Michael Stabley
(74) *Attorney, Agent, or Firm* — Ingrassia Fisher & Lorenz, P.C.

(57) ABSTRACT

A method of controlling a motor current for a vehicle having a motor and a steering system includes the steps of obtaining a torque signal from the steering system, calculating a torque, and adjusting the motor current based at least in part on the torque signal, the torque gain, or both.

17 Claims, 3 Drawing Sheets

METHODS AND SYSTEMS FOR CONTROLLING MOTOR CURRENT IN STEERING SYSTEMS OF VEHICLES EQUIPPED WITH ELECTRIC STEERING ASSIST

TECHNICAL FIELD

The present invention generally relates to the field of vehicles and, more specifically, to methods and systems for controlling motor current in vehicles equipped with electric steering assist.

BACKGROUND OF THE INVENTION

Many vehicles today have electric power steering systems. Electric power steering (EPS) systems typically use an electric motor to provide a steering assist to a driver of the vehicle, thereby reducing effort by the driver in steering the vehicle. In this invention, a control algorithm is implemented with an existing control system to aggressively alleviate steering wheel vibrations.

Smooth road shake (SRS) is one of the vibrations leading to customers complaints. SRS is caused by external excitation such as irregular road surfaces and internal periodic excitation such as tire/wheel imbalance, tire irregularities, brake rotor imbalance and lack of precision piloting of the rotating members. The SRS condition occurs in both EPS and HPS (Hydraulic Power Steering) systems. The EPS system or HPS system with active control devices provides an opportunity to change the control algorithm in the ECU (electronic control unit) to mitigate SRS.

Accordingly, it is desirable to improve the current EPS control system to reduce the steering wheel vibration of the vehicles. It is further desired to provide an improved system for such control of motor current in vehicles. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method of controlling a motor current for a vehicle having a motor and a steering system is provided. The method comprises the steps of obtaining a torque signal from the steering system, calculating a torque gain, and adjusting the motor current based at least in part on the torque signal, the torque gain, or both.

In accordance with another exemplary embodiment of the present invention, a program product for controlling a motor current for a vehicle having a motor and a steering system is provided. The program product comprises a program and a computer-readable signal-bearing media. The program is configured to at least facilitate obtaining a torque signal from the steering system, calculating a torque gain, and adjusting the motor current based at least in part on the torque signal, the torque gain, or both. The computer-readable signal-bearing media bears the program.

In accordance with a further exemplary embodiment of the present invention, a system for controlling a motor current for a vehicle having a motor and a steering system is provided. The system comprises a sensor and a processor. The sensor is configured to at least facilitate obtaining a torque signal from the steering system. The processor is connected to the sensor, and is configured to at least facilitate calculating a torque gain and adjusting the motor current based at least in part on the torque signal, the torque gain, or both.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1A:
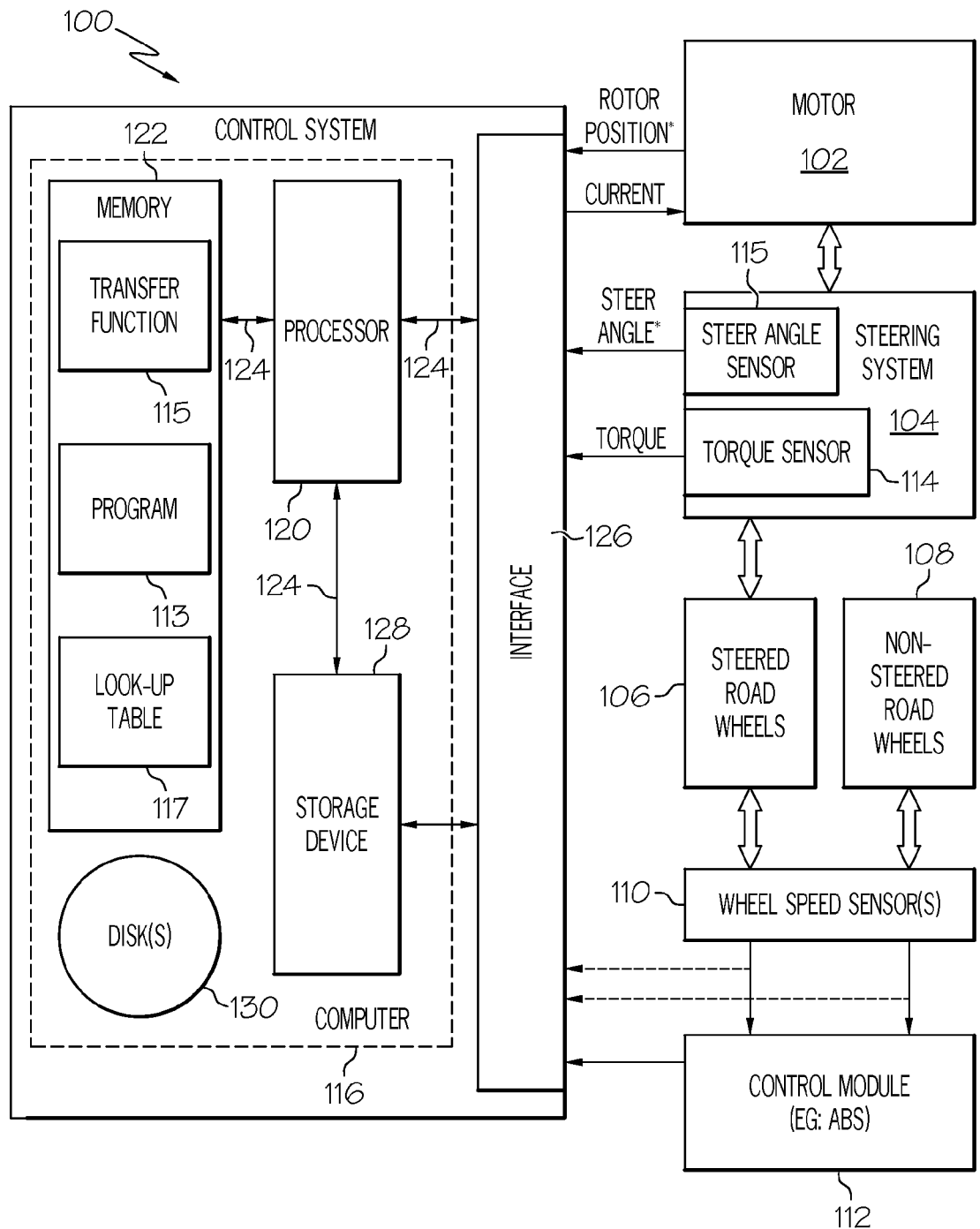
FIG. 1A and FIG. 1B are functional block diagrams of a control system for controlling motor current in an EPS system based upon a torque signal from a steering system of the vehicle, and shown along with the steering system, an electric motor, and steering wheels of the vehicle, in accordance with exemplary embodiments of the present invention.
Figure 1B:
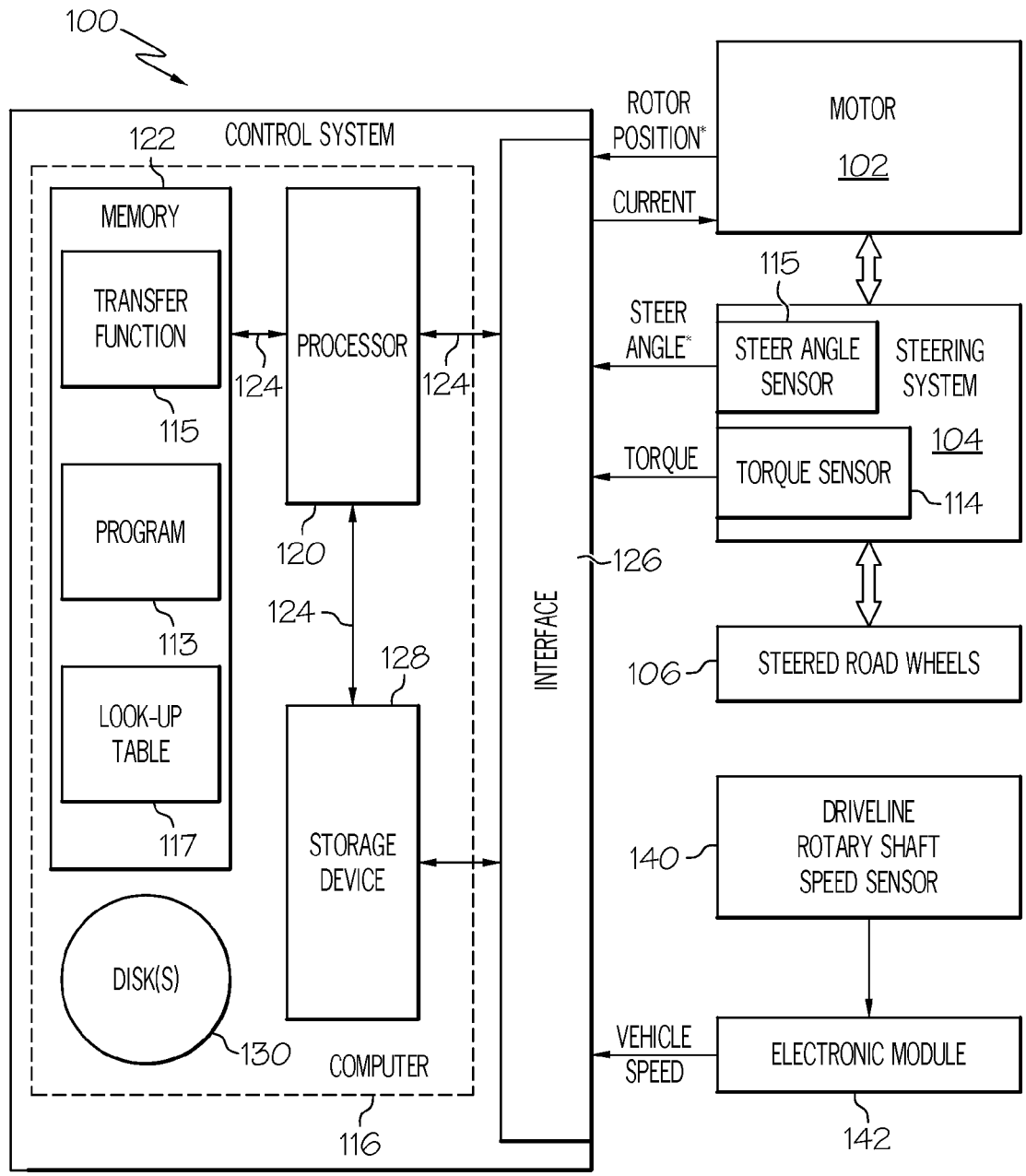

FIGS. 1A and 1B each are functional block diagrams showing a control system 100 for controlling motor current in a vehicle having a motor 102, a steering system 104, and a plurality of road wheels 106 and 108, in accordance with an exemplary embodiment of the present invention. In certain preferred embodiments, the vehicle comprises an automobile such as a sedan, a truck, a van, a sport utility, a cross-over vehicle, or another type of automobile. However, in various embodiments, the control system 100 can be used in connection with any number of types of vehicles.

In a preferred embodiment, the steering system 104 comprises a steering wheel, steering column, steering gear, intermediate connecting shafts between the column and the gear, connection joints, either flexible or rigid, allowing desired articulation angles between the intermediate connecting shafts, and tie-rods. The steering gear, in turn, comprises a rack, input shaft, and internal gearing.) Specifically, the control system 100 controls the motor current based upon a torque signal from the steering system 104 received from the torque sensor 114, and preferably also based upon a steer angle sensor 115.

Specifically, the motor 102 is coupled to the steering system 104, and provides torque or force to a rotatable or translational member of the steering system 104 with a magnitude based on the motor current. The motor 102 can be coupled to the rotatable shaft of the steering column or to the rack of the steering gear. In the case of a rotary motor, the motor 102 is typically connected through a geared or belt driven configuration enabling a favorable ratio of motor shaft rotation to either column shaft rotation or rack linear movement. The steering system 104 in turn influences the steerable road wheels 106 during steering based upon the assist torque received from the motor 102 along with any torque received from a driver of the vehicle.

The EPS control system 100 is connected to the motor 102, the steering system 104, and one or more of the road wheels 106 indirectly coupled thereto. In certain embodiments, as depicted in FIGS. 1A and 1B, the control system 100 comprises a torque sensor 114, and speed sensor(s) 110. In certain embodiments, the speed sensor(s) 110 are coupled to one or more of the plurality of road wheels 106 and 108, and can be part of the EPS control system 100. However, in various other embodiments, different speed sensors 110 and/or devices may be used (e.g., a driveline rotary shaft speed sensor 140 as depicted in FIG. 1B, and/or one or more other different types of sensors), which may belong to the EPS control system 100 or alternatively another module of the vehicle, such as an electronic module 142 of FIG. 1A and/or a control module 112 of FIG. 1B, such as an ABS (anti-lock braking system) module.

The torque sensor 114 (or other sensor to obtain the torque signal) is coupled to the steering system 104. The torque sensor 114 generates an electronic torque signal proportional to the static or dynamic mechanical torque in one of the shafts connecting the steering wheel to the steering gear. The torque signal is presented to the computer system 116 for processing or using to adjust the motor current as appropriate. The steer angle sensor 115 is also coupled to the steering system, preferably to the steering column, and generates an electronic steering angle signal representing a steering angle of the vehicle.

The speed sensor(s) 110 are coupled to one or more of the road wheels 106 and 108. The speed sensor(s) 110 enable determination of vehicle speed. The speed information is communicated to the computer system 116 and is used for adjusting the motor current as appropriate. In other embodiments, one or more other sensors and/or other devices may be used, instead of or in addition to the speed sensor(s) 110, in determining the vehicle speed, such as a driveline rotary shaft speed sensor 140 as depicted in FIG. 1B.

The computer system 116 is connected to the torque sensor 114, the speed sensor(s) 110, and to the motor 102. The computer system 116 receives the torque signal or information pertaining thereto from the torque sensor 114, and the wheel speed or information pertaining thereto from the speed sensor(s) 110. The computer system 116 processes this information in determining appropriate adjustments to the motor current using the steps of the process 200 of FIG. 2 and described further below in connection therewith.

Preferably, the computer system 116 utilizes this information to selectively adjust the motor current so as to effectively reduce steering wheel vibrations in the vehicle under appropriate circumstances, in accordance with the steps of the process 200 described further below in connection with FIG. 2. In certain embodiments, the computer system 116 may be connected to one or more sensors and/or other devices, instead of or in addition to those provided above, for example one or more alternate sensors for obtaining information for use in calculating the vehicle speed.

In the depicted embodiment, the computer system 116 includes a processor 120, a memory 122, a computer bus 124, an interface 126, and a storage device 128. The processor 120 performs the computation and control functions of the computer system 116 or portions thereof, and may comprise any type of processor or multiple processors, single integrated circuits such as a microprocessor, or any suitable number of integrated circuit devices and/or circuit boards working in cooperation to accomplish the functions of a processing unit.

During operation, the processor 120 executes one or more programs 113 preferably stored within the memory 122 and, as such, controls the general operation of the computer system 116.

In a preferred embodiment, the processor 120 receives the torque signal or information pertaining thereto from the torque sensor 114, and the wheel speed or information pertaining thereto from the speed sensor(s) 110 via the computer bus 124, processes this information, and controls and adjusts the motor current accordingly. In so doing, the processor 120 preferably executes the one or more programs 113 stored in the memory 122.

As referenced above, the memory 122 stores a program or programs 113 that execute one or more embodiments of processes such as the process 200 described below in connection with FIG. 2 and/or various steps thereof and/or other processes, such as those described elsewhere herein. In the depicted embodiment, the memory 122 also stores a plurality of transfer function parameters and related information 115, and one or more look-up tables 117 for use in processing the current measure of the torque signal or information pertaining thereto, and the wheel speed(s) or information pertaining thereto for use in controlling and adjusting the motor current.

The memory 122 can be any type of suitable memory. This would include the various types of dynamic random access memory (DRAM) such as SDRAM (synchronous dynamic access memory), the various types of static RAM (SRAM), and the various types of non-volatile memory (PROM (programmable read only memory), EPROM (erasable programmable read only memory), and flash. It should be understood that the memory 122 may be a single type of memory component, or it may be composed of many different types of memory components. In addition, the memory 122 and the processor 120 may be distributed across several different computers that collectively comprise the computer system 116. For example, a portion of the memory 122 may reside on a computer within a particular apparatus or process, and another portion may reside on a remote computer.

The computer bus 124 serves to transmit programs, data, status and other information or signals between the various components of the computer system 116 and the signals from other modules. The computer bus 124 can be any suitable physical or logical means of connecting computer systems and components. This includes, but is not limited to, direct hard-wired connections, fiber optics, infrared and wireless bus technologies, a LAN (local area network) bus, a CAN (controller area network) bus and/or one or more other technologies.

The interface 126 allows communication to the computer system 116, for example from a vehicle occupant, a system operator, and/or another computer system, and can be implemented using any suitable method and apparatus. In certain embodiments, the interface 126 at least facilitates providing the current measure of the torque signal or information pertaining thereto from the torque sensor 114, and/or the wheel speed or information pertaining thereto from the speed sensor(s) 110. The interface 126 can include one or more network interfaces to communicate within or to other systems or components, one or more terminal interfaces to communicate with technicians, and one or more storage interfaces to connect to storage apparatus such as the storage device 128.

The storage device 128 can be any suitable type of storage apparatus, including direct access storage devices such as hard disk drives, flash systems, floppy disk drives and optical disk drives. In one exemplary embodiment, the storage device 128 is a program product from which memory 122 can receive a program 113 that executes one or more embodiments of the process 200 of FIG. 2 and/or steps thereof as described in greater detail further below. In one preferred embodiment, such a program product can be implemented as part of, inserted into, or otherwise connected to the control system 100. As shown in FIGS. 1A and 1B, the storage device 128 can comprise a disk drive device that uses disks 130 to store data, information, or programs. As one exemplary implementation, the computer system 116 may also utilize Internet connectivity, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 130), and transmission media such as digital and analog communication links. It will similarly be appreciated that the computer system 116 may also otherwise differ from the embodiment depicted in FIGS. 1A and 1B, for example in that the computer system 116 may be connected to or may otherwise utilize one or more remote computer systems and/or other control systems.

Figure 2:
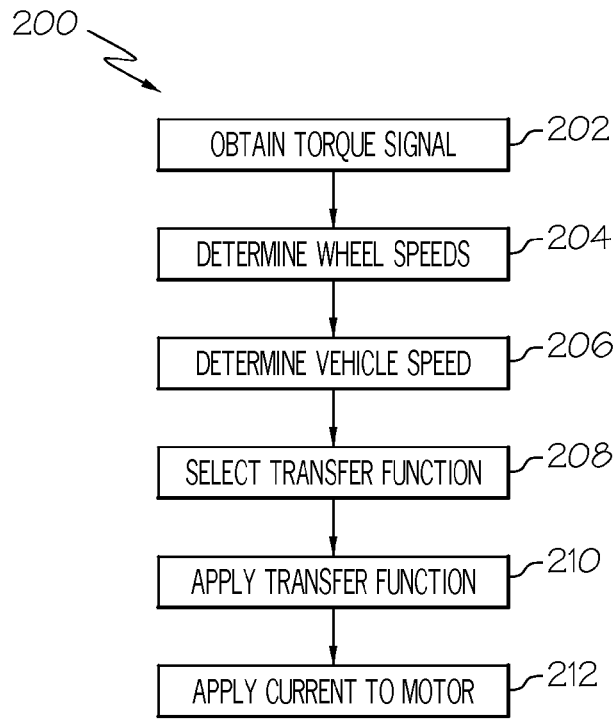
FIG. 2 is a flowchart of a process for controlling motor current in a vehicle based upon a torque signal from a steering system of the vehicle, and that can be implemented in connection with the control system of FIGS. 1A and 1B, in accordance with an exemplary embodiment of the present invention.

FIG. 2 is a flowchart of a process 200 for controlling EPS motor current in a vehicle, in accordance with an exemplary embodiment of the present invention. Specifically, the process 200 controls the motor current based upon a torque signal from a steering system and vehicle speed in order to reduce smooth road shake or other unwanted vibrations in the vehicle. In a preferred embodiment, the process 200 can be implemented in connection with the control system 100 of FIGS. 1A and 1B and/or through program products that can be utilized in connection therewith. However, it will be appreciated that in various embodiments the process 200 may also be utilized in connection with any number of different types of systems and/or other devices.

As depicted in FIG. 2, the process 200 begins with the step of obtaining a torque signal (step 202). In a preferred embodiment, the torque signal is generated by the torque sensor 114 of FIGS. 1A and 1B and is in turn provided to the processor 120 of FIGS. 1A and 1B via the interface 126 of FIGS. 1A and 1B.

In addition, vehicle speed values are preferably obtained from wheel speeds (step 204). In a preferred embodiment, a single wheel speed value is determined by the speed sensor(s) 110 of FIGS. 1A and 1B from at least one of the road wheels 106 and 108 of FIGS. 1A and 1B and is provided to the processor 120 of FIGS. 1A and 1B via the interface 126 of FIGS. 1A and 1B. In another preferred embodiment, multiple wheel speed values are obtained from one or more speed sensors 110 of FIGS. 1A and 1B from multiple road wheels 106, 108 of FIGS. 1A and 1B and are provided to the processor 120 of FIGS. 1A and 1B via the interface 126 of FIGS. 1A and 1B. Also, as mentioned above, in certain embodiments, vehicle speed values may be obtained from one or more other sources, for example via one or more estimates of vehicle speed obtained from other vehicle modules, such as the ABS module.

Next, a vehicle speed is determined (step 206). In a preferred embodiment, the vehicle speed is determined by the processor 120 of FIGS. 1A and 1B based on the one or more wheel speeds determined in step 204. Also, as mentioned above, in certain embodiments, vehicle speed values may be obtained from one or more other sources, for example via one or more speed estimates of other vehicle modules. In addition, in certain other embodiments, the vehicle speed may be determined using one or more other input values (for example, input values from a global positioning satellite device, a LAN or CAN bus, and/or via one or more other technologies), in which case step 206 may be modified to obtain such other input values for determining the vehicle speed.

In addition, a transfer function is selected (step 208). The transfer function will provide frequency dependent gains based on vehicle speed. In a preferred embodiment, the transfer function is selected by the processor 120 of FIGS. 1A and 1B among a plurality of transfer functions 115 stored in the memory 122 of FIGS. 1A and 1B based on the particular vehicle system and speed. However, this may vary in other embodiments.

The process continues with the step of applying the selected transfer function using the torque signal as input (step 210). In conventional, present-day EPS control systems a purposefully implemented transfer function exists between the torque sensed by the torque sensor and the resultant motor current. For purposes of illustration, this transfer function may comprise gain factors shown in FIG. 3, and, in aggregate, is hereafter referred to as base gain (304). Such transfer functions typically target performance at low frequencies in an attempt to achieve desirable low frequency (for example, approximately 0-3 hz), forward-driven steering and handling vehicular characteristics.

Figure 3:
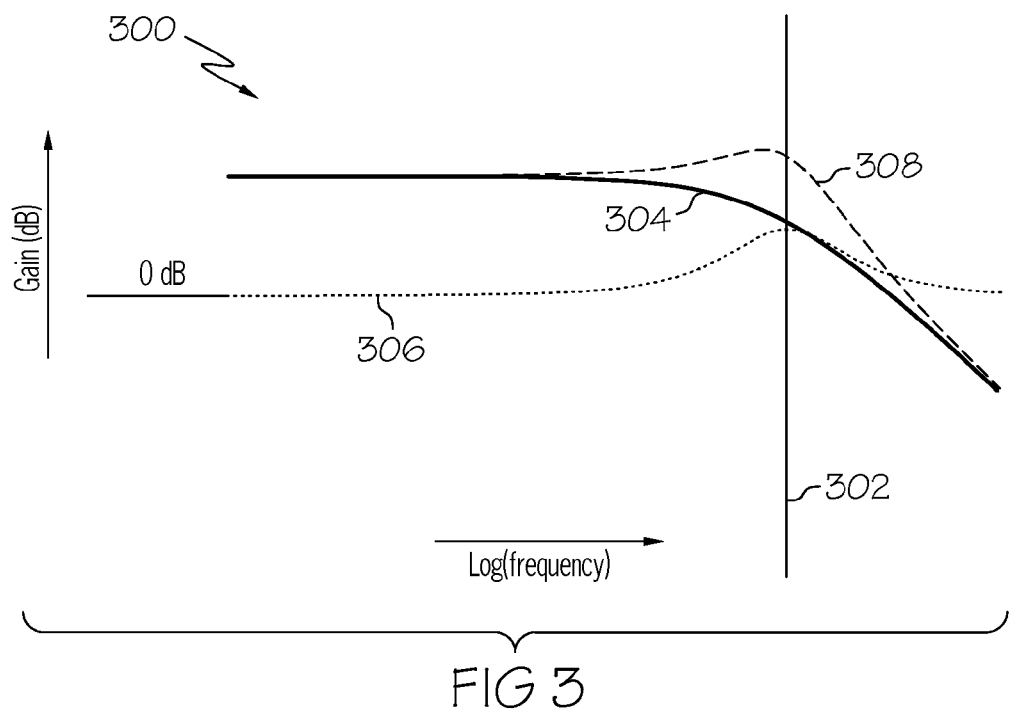
FIG. 3 is a graph illustrating exemplary transfer functions and gains associated with the control system of FIGS. 1A and 1B and the process of FIG. 2, in accordance with an exemplary embodiment of the present invention.

SRS, however, resides in a relatively narrow band of frequencies extending from approximately 10 hz to 20 hz, depending on the speed and particular vehicle system. Because the most significant excitation component of SRS exists at a frequency that is periodic in tire-wheel rotation rate, corresponding to the $1^{st}$ or $2^{nd}$ even multiple of the rotation frequency of the tire-wheel assembly, maximum steering wheel vibration typically occurs at speeds where there is proximate or exact alignment of this periodic frequency with a vehicle subsystem resonant frequency, such as arising in the suspension, steering, or combinations of steering and suspension. It is therefore desirable to achieve attenuation of this frequency-dependent response with a superimposed boost in gain. Maximum boost in gain, furthermore, occurs at a frequency (302) approximately equal to that at which maximum periodic steering vibration would occur in the absence of this gain boost. Such boost gain (306) can be characterized as shown in FIG. 3 with a local maximum at or near the peak frequency of the steering vibration occurring in the absence of the boosted gain.

In a preferred embodiment, the boost gain results from the application of the superimposable transfer function characterized by the boost gain. Also in a preferred embodiment, the transfer function is selected and applied and the boost gain calculated such that: (a) the boost gain is at least approximately 0 dB when the expected periodic frequency of the disturbance is in a first range associated with no smooth road shake (or other vibration) in the vehicle either above or below the critical bandwidth of frequencies responsible for SRS, (b) the boost gain is greater than 0 dB when the expected periodic frequency of the vibratory disturbance is in a second range associated with smooth road shake (or other vibration) in the vehicle. The boost gain generally reaches the maximum gain value at or near the peak resonance of the vibration. One method for estimating the expected periodic frequency is determined by sensing speed since the periodic frequency is dictated by the rotational rate of the tire. Another method employs spectral analysis of the torque signal and detection of prominent periodic content by any number of techniques known to those skilled in the art.

Next, a gained motor current is calculated based on the total cascaded gain (308) (applied in step 210). In a preferred embodiment, the gained motor current is achieved by the product of the base gain and the boost gain, operating on the input torque signal from the torque sensor. Accordingly, in such a preferred embodiment, the gained torque is approximately equal to the torque transformed via base gain 304 in situations in which the torque frequency is in the above-referenced first range associated with no smooth road shake in the vehicle. Likewise, in such a preferred embodiment, the gained torque is relatively greater than the torque transformed via base gain 304 in the SRS band of frequencies and is substantial and effective when the torque frequency is not in the above-referenced first range associated with no road shake in the vehicle.

The level of boost gain is achieved by implementing increases in overall gain approximately equal to +3-20 dB above the base gain at a peak boost frequency and can be a function of speed. Other considerations, however, such as stability margin will limit the maximum boost gain and due care must be exercised in achieving maximum boost without significantly compromising stability margins. Characteristics of the boost gain may also include favorable lead, thereby improving stability margins. Those skilled in the art will recognize the need for such considerations. Those skilled in the art will also recognize alternate effective methods for achieving equivalent cascaded gain effects, and departures from the preceding description.

Effective attenuation of SRS can also be achieved by increasing cascaded gain at the expected band of frequencies, regardless of the levels of gain at adjacent or all remaining bands of frequencies. The preceding is only illustrative, intended to achieve attenuated SRS with minimal impact on other steering performance, for example, forward driven low frequency vehicle steering response and system stability margin. Next, a desired motor current is calculated based on the gained torque magnitude. In a preferred embodiment, the desired motor current is calculated by the processor 120 of FIGS. 1A and 1B, using a look-up table 117 of transfer function parameters, stored in the memory 122 of FIGS. 1A and 1B. The look-up table 117 preferably correlates vehicle speed and gained torque with the desired motor current. Specifically, in a preferred embodiment, the look-up table 117 uses the vehicle speed and the measured torque as inputs and supplies the desired motor current as an output. The look-up table 117 is preferably designed and/or selected so that it specifies an optimal amount of motor current that would minimize road shake given the particular vehicle speed and adjusted torque magnitude used as inputs while simultaneously achieving other performance demands, such as maintaining system stability.

Next, the motor current is applied (step 212). Specifically, any required adjustments are made to the motor current as determined above in order to minimize smooth road shake in the vehicle given the dynamic conditions present in the vehicle as represented by the calculated vehicle speed along with the torque magnitude and periodic torque frequency as determined from the inputs. In a preferred embodiment, the motor current is applied using instructions provided from the processor 120 of FIGS. 1A and 1B to the motor 102 of FIGS. 1A and 1B. The steps in the process 200 are preferably continuously repeated in order to continually adjust the motor current in order to minimize smooth road shake as the conditions and input variables change.

It will be appreciated that certain steps of the process 200 may vary from those depicted in FIGS. 1A and 1B and described herein in certain embodiments. In addition, although the preceding describes the application of control algorithms using a Transfer Function method, implementations with appropriate filtering techniques, such as digital, analog, or programmable software, or combinations thereof, provide equivalent performance. Such configurations, furthermore, are more likely hardware implementations of these methods, but are not as convenient in their descriptive characterizations. Those skilled in the art recognize these as equivalent methods. It will similarly be appreciated that certain steps of the process 200 may be performed simultaneously or in a different order than that depicted in FIG. 2 and described herein.

Accordingly, improved methods, program products, and systems are provided for optimally controlling motor current in a vehicle. The improved methods, program products, and systems allow for smooth road shake to be better controlled based on dynamic inputs represented by the calculated vehicle speed along with the torque frequency and torque magnitude as determined from the torque signal received from the steering system of the vehicle. The improved methods, program products, and systems thus allow for motor current to be increased at vehicle speeds and torque frequencies that are likely to result in smooth road shake to thereby minimize the smooth road shake under these conditions, while also allowing for the motor current to remain unchanged at vehicle speeds and torque frequencies that are unlikely to result in smooth road shake.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, sport utilities, and cross-over vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling a motor current for a vehicle having a motor and a steering system, the method comprising the steps of:
    obtaining a torque signal from the steering system;
    calculating a vehicle speed;
    selecting a transfer function that provides frequency dependent torque gains based on the vehicle speed;
    calculating a torque gain as a product of a torque base gain and a torque boost gain using the transfer function and the vehicle speed; and
    adjusting the motor current based at least in part on the torque gain and the torque signal.

2. The method of claim 1, further comprising the steps of:
   determining a torque signal frequency based at least in part on the torque signal, the vehicle speed, or both;
   wherein the step of calculating the torque gain comprises the step of calculating the torque gain based at least in part on the torque signal frequency.

3. The method of claim 1,
   wherein the torque boost gain reaches a maximum value at a peak resonance of vibration of the vehicle.

4. The method of claim 1, wherein the step of selecting the transfer function comprises the step of selecting the transfer function, such that:
   the torque boost gain is at least approximately equal to 0 dB when the torque signal frequency is in a first range associated with no shake in the vehicle; and
   the torque boost gain is greater than 0 dB when the torque signal frequency is in a second range associated with shake in the vehicle.

5. The method of claim 1, further comprising the step of:
   determining a torque signal magnitude; and
   calculating an adjusted torque magnitude based at least in part on the torque signal magnitude and the torque gain;
   wherein the step of adjusting the motor current comprises the step of adjusting the motor current based at least in part on the adjusted torque magnitude.

6. The method of claim 5, further comprising the step of:
   calculating a desired motor current based at least in part on the adjusted torque magnitude and the vehicle speed;
   wherein the step of adjusting the motor current comprises the step of adjusting the motor current based at least in part on the desired motor current.

7. A system for controlling a motor current for a vehicle having a motor and a steering system, the system comprising:
   a sensor configured to at least facilitate obtaining a torque signal from the steering system;
   a memory configured to store a plurality of transfer functions; and
   a processor coupled to the sensor and configured to at least facilitate:
      calculating a vehicle speed;
      selecting a transfer function from the plurality of transfer functions stored in the memory that provides frequency dependent torque gains based on the vehicle speed;
      calculating a torque gain using the transfer function and the vehicle speed; and
      adjusting the motor current based at least in part on the torque signal and the torque gain.

8. The system of claim 7, wherein the processor is further configured to at least facilitate:
   determining a torque signal frequency based at least in part on at the torque signal, the vehicle speed, or both; and
   calculating the torque gain based at least in part on the torque signal frequency.

9. The system of claim 7, wherein the vehicle comprises a plurality of wheels, and the system further comprises:
   a second sensor configured to at least facilitate determining a wheel speed of one or more of the plurality of wheels;
   wherein the processor is coupled to the second sensor and is further configured to calculate the vehicle speed based at least in part on the wheel speed.

10. The system of claim 7,
    wherein the processor is is further configured to at least facilitate: calculating the torque gain as a product of a torque base gain and a torque boost gain using the transfer function and the vehicle speed.

11. The system of claim 7, wherein the processor is configured to select the transfer function such that:
    the torque gain is at least approximately equal to 0 dB when the torque signal frequency is in a first range associated with no shake in the vehicle; and
    the torque gain is greater than zero when the torque signal frequency is in a second range associated with shake in the vehicle.

12. A method of controlling a motor current for a vehicle having a motor and a steering system, the method comprising the steps of:
    obtaining a torque signal from the steering system;
    determining a torque signal magnitude;
    calculating a vehicle speed;
    selecting a transfer function that provides frequency dependent torque gains based on the vehicle speed;
    calculating a torque gain using the transfer function and the vehicle speed;
    calculating an adjusted torque magnitude based at least in part on the torque signal magnitude and the torque gain; and
    adjusting the motor current based at least in part on the adjusted torque magnitude.

13. The method of claim 12, further comprising the steps of:
    determining a torque signal frequency based at least in part on the torque signal, the vehicle speed, or both;
    wherein the step of calculating the torque gain comprises the step of calculating the torque gain based at least in part on the torque signal frequency.

14. The method of claim 12, wherein the step of calculating the torque gain comprises the step of calculating the torque gain as a product of a torque base gain and a torque boost gain based at least in part on the transfer function and the vehicle speed.

15. The method of claim 14, wherein the torque boost gain reaches a maximum value at a peak resonance of vibration of the vehicle.

16. The method of claim 14, wherein the step of selecting the transfer function comprises the step of selecting the transfer function, such that:
    the torque boost gain is at least approximately equal to 0 dB when the torque signal frequency is in a first range associated with no shake in the vehicle; and
    the torque boost gain is greater than 0 dB when the torque signal frequency is in a second range associated with shake in the vehicle.

17. The method of claim 12, further comprising the step of:
    calculating a desired motor current based at least in part on the adjusted torque magnitude and the vehicle speed;
    wherein the step of adjusting the motor current comprises the step of adjusting the motor current based at least in part on the desired motor current.

* * * * *